(12) United States Patent
Inoue et al.

(10) Patent No.: US 6,453,947 B1
(45) Date of Patent: Sep. 24, 2002

(54) ELECTROMAGNETIC VALVE

(75) Inventors: Seizo Inoue; Hiromichi Tsugami, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 34 days.

(21) Appl. No.: 09/604,966

(22) Filed: Jun. 28, 2000

(30) Foreign Application Priority Data

Mar. 16, 2000 (JP) ......................................... 2000-073516

(51) Int. Cl.⁷ ............................................. F15B 13/044
(52) U.S. Cl. ............................ 137/625.65; 251/129.16; 137/625.69
(58) Field of Search ................... 137/625.65, 625.69; 251/219.08, 129.16, 282

(56) References Cited

U.S. PATENT DOCUMENTS

| | | | | |
|---|---|---|---|---|
| 3,370,613 A | * | 2/1968 | Weaver ................... | 251/282 X |
| 3,899,003 A | * | 8/1975 | Tirelli ..................... | 137/625.65 |
| 5,186,204 A | * | 2/1993 | Oka et al. ................ | 137/238 |
| 5,197,507 A | * | 3/1993 | Miki et al. ............... | 137/1 |
| 5,441,233 A | * | 8/1995 | Asou et al. .............. | 251/129.15 |
| 5,615,860 A | * | 4/1997 | Brehm et al. ........... | 251/129.07 |
| 5,697,401 A | * | 12/1997 | Shinoda et al. ......... | 137/625.62 |
| 5,937,904 A | * | 8/1999 | Wunder .................. | 137/625.65 |
| 6,174,219 B1 | * | 1/2001 | Mathews ................. | 451/8 |
| 6,179,005 B1 | * | 1/2001 | Inami ...................... | 137/625.65 |

FOREIGN PATENT DOCUMENTS

JP 1-164875 6/1989

OTHER PUBLICATIONS

Handbook of Oil and Air Pressures.

* cited by examiner

*Primary Examiner*—John Rivell
(74) *Attorney, Agent, or Firm*—Sughrue Mion, PLLC (57) ABSTRACT

An electromagnetic valve is constructed such that lengths of sealing portions, formed by a housing 8 and a spool valve 7 respectively between an input port 8a and a feed-back chamber 11 and between the feed-back chamber 11 and a core 4, are unchanged upon movement of the spool valve; and aligning grooves 15a and 15b are respectively formed between the input port 8a and the feed-back chamber 11 and between the feed-back chamber 11 and the core 4, whereby a smooth and stable pressure is constantly obtainable in response to an applied current even though a supplied pressure is high.

8 Claims, 8 Drawing Sheets

PRIOR ART

ELECTROMAGNETIC VALVE

BACKGROUND OF THE INVENTION

1. Field of the Invention

The present invention relates to an electromagnetic valve.

2. Discussion of Background

Figure 6:
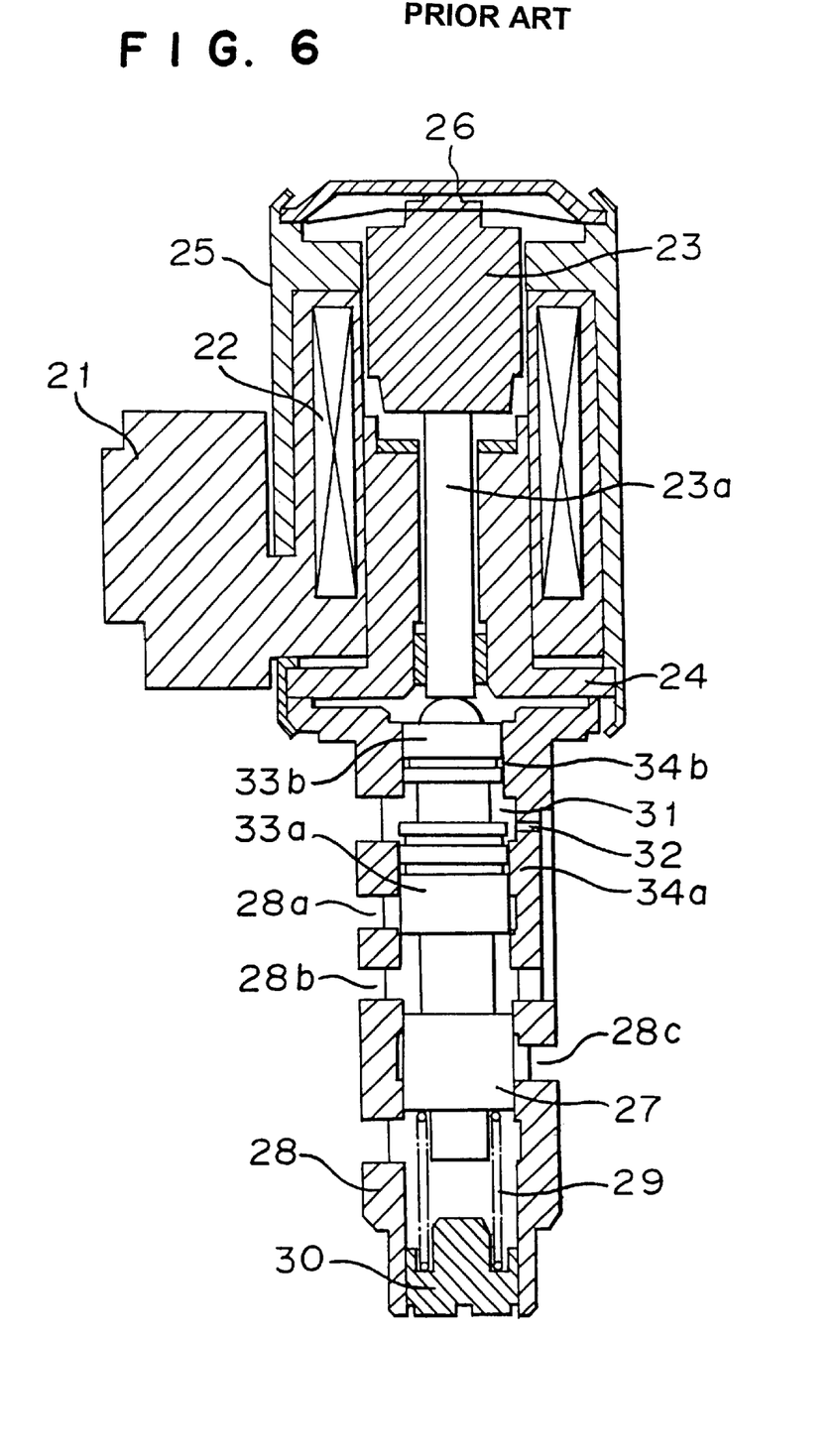
FIG. 6 is a side cross-sectional view illustrating a state that a spool valve is moved to fully open a flow passage on a side of an input port in a conventional electromagnetic valve.
Figure 7:
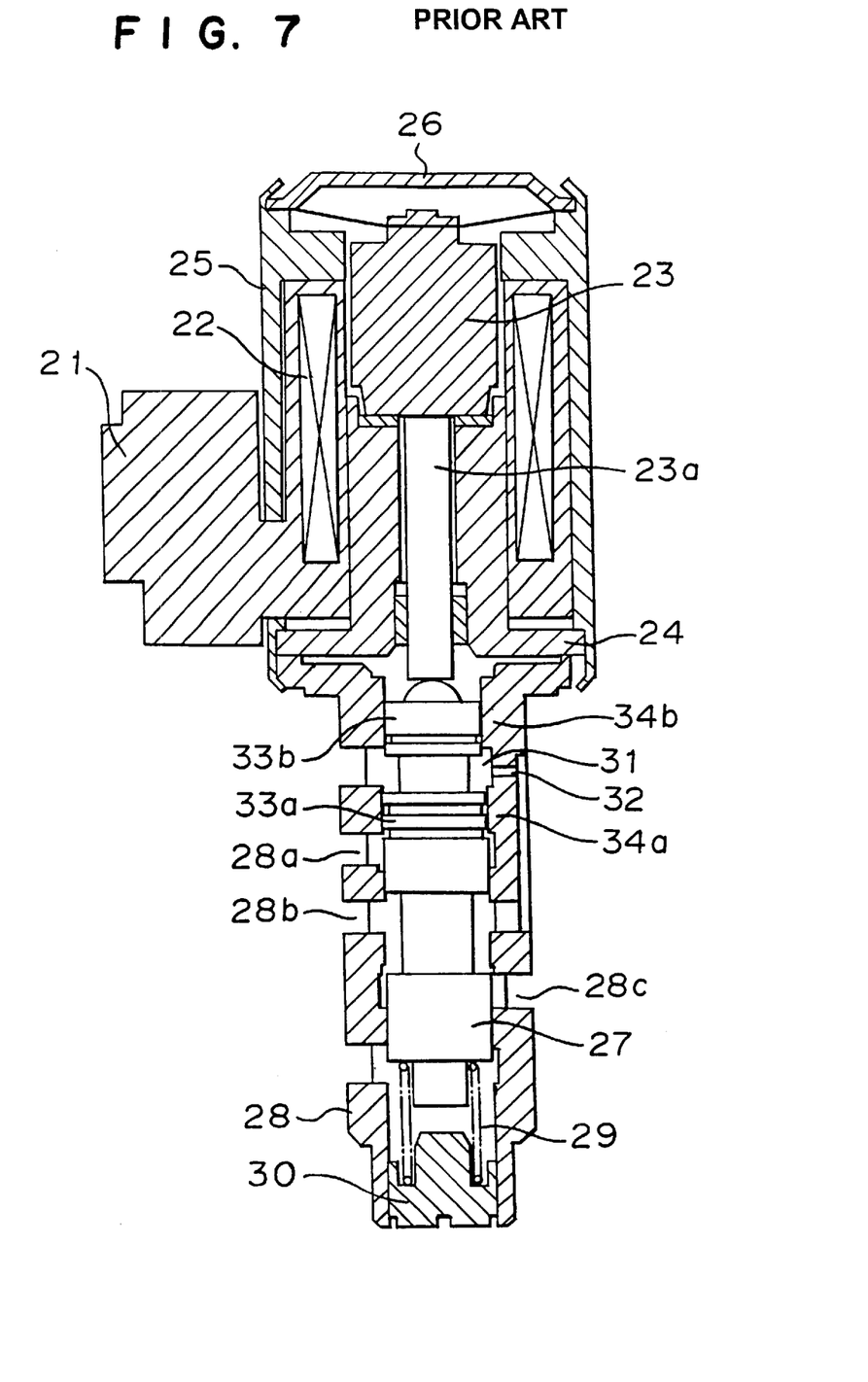
FIG. 7 is a side cross-sectional view illustrating a state that the spool valve is moved to fully open a flow passage on a side of a drain port in the conventional electromagnetic valve.

FIGS. 6 and 7 are side cross-sectional views illustrating a conventional electromagnetic valve. FIG. 6 illustrates a state that a spool valve is moved to be in a state that a flow passage on a side of an input port is fully opened at a time that a coil is not applied with a current. FIG. 7 illustrates a state that the spool valve is moved to be in a state that a flow passage on a side of a drain port is fully opened at a time that a current is applied to the coil. In the figures, numerical reference 21 designates a bobbin; numerical reference 22 designates a coil wound around the bobbin 21; numerical reference 23 designates a movable iron core; numerical reference numeral 23a designates a rod inserted in and fixed to the movable iron core 23; numerical reference 24 designates a core forming a magnetic circuit; numerical reference 25 designates a case forming the magnetic circuit in a manner similar to that in the core 24 and accommodating the above-mentioned component; numerical reference 26 designates a cap regulating a movement of the movable iron core 23 in a direction opposite to that of the core 24; numerical reference 27 designates a spool valve pushed by the rod 23a; numerical reference 28 designates a housing, in which the spool valve 27 inserted in the housing slides on a bore thereof; numerical reference 28a designates an input port; numerical reference 28b designates an output port; and numerical reference 28c designates a drain port.

Numerical reference 29 designates a spring urging the movable iron core 23 and the spool valve 27 in a direction of the cap 26; numerical reference 30 designates an adjust screw adjusting a force of the spring 29; numerical reference 31 designates a feed-back chamber formed by steps of the spool valve 27 and the housing 28; numerical reference 32 designates a feed-back choke introducing an output pressure to the feed-back chamber 31; numerical reference 33a designates a spool land as a part of the spool valve 27 for sealing leakage from the input port 28a to the feed-back chamber 31 in collaboration with the housing 28; numerical reference 33b designates a spool land as a part of the spool valve 27 for sealing leakage from the feed-back chamber 31 to the core 24 in collaboration with the housing 28; numerical reference 34a designates a housing land as a part of the housing 28 for sealing leakage from the input port 28a to the feed-back chamber 31 in collaboration with the spool valve 27; and numerical reference 34b designates a housing land as a part of the housing 28 for sealing leakage from the feed-back chamber to the core 24 in collaboration with the spool valve 27.

In the next, an operation will be described. As illustrated in FIG. 6, when a current is not applied, the spool valve 27 is positioned at a point where the force of the spring 29 is balanced with a feed-back force, generated by the output pressure introduced into the spool valve feed-back chamber 31 through the feed-back choke 32, wherein a pressure corresponding to an initial set force of the spring 29 is applied to the output port 28b. When the current is applied to the coil 22, as illustrated in FIG. 7, an electromagnetic force attracting the movable iron core 23 in a direction of the core 24. Therefore, the balancing point is changed, and a rate of choking the input port 28a and the drain port 28c is changed by the spool valve 27, whereby the output pressure is decreased. Accordingly, the output pressure is in proportion to the current applied to the coil 22.

Figure 8:
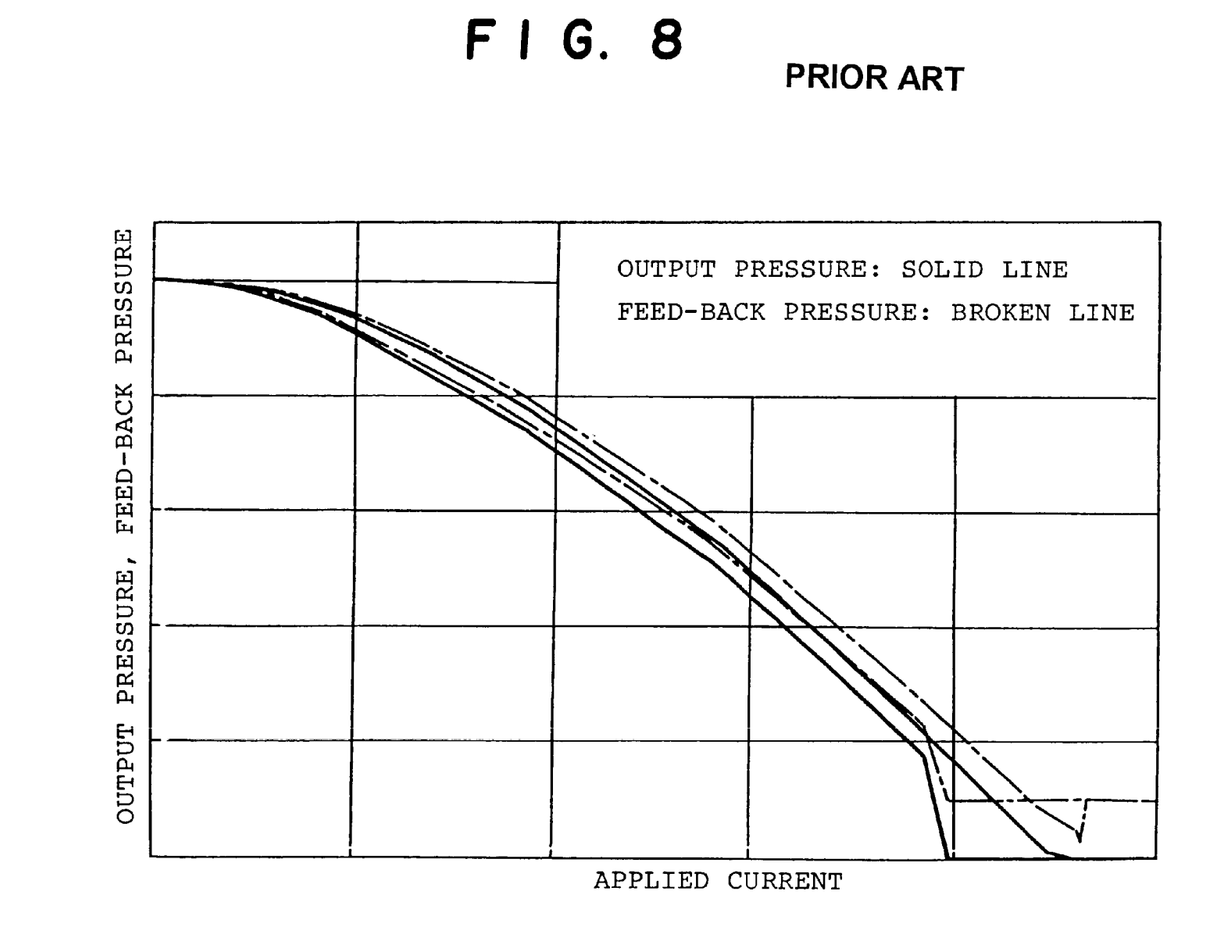
FIG. 8 illustrates a relationship between an output pressure and a feed-back pressure with respect to a current applied to the conventional electromagnetic valve.

The conventional electromagnetic valve is constructed so that the output pressure is determined by balancing of the spring force, the feed-back force, an electromagnetic force, and feed-back force and the output pressure is in a relationship of 1:1. However, if lengths of seals respectively between the input port and feed-back chamber and of the feed-back chamber and the core are changed upon movement of the spool valve, the feed-back force, i.e. pressure, becomes independent of the output pressure by leakages from the input port to the feed-back chamber and from the feed-back chamber to the core, whereby the output pressure is not sufficiently increased even though a current is decreased to reduce an electromagnetic force, as illustrated in FIG. 8.

Further, when a pressure applied to the input port is increased, balancing of the pressure around the spool valve is disturbed, and a phenomenon called hydraulic lock, i.e. the spool valve is pushed to the housing, occurs to disturb balancing of the spring force, the feed-back force, and the electromagnetic force. Thus, there is a problem that the output pressure corresponding to a designated current is not obtainable.

SUMMARY OF THE INVENTION

It is an object of the present invention to solve the above-mentioned problems inherent in the conventional technique and to provide an electromagnetic valve which constantly and stably outputs an output pressure even though a supply pressure is high.

According to a first aspect of the present invention, there is provided an electromagnetic valve comprising: a bobbin, accommodated in a case and wound by a coil; a core located in a central portion of the bobbin and forming a magnetic circuit; a movable iron core, sucked in a direction of the core when a current is applied to the coil; a rod, integrally assembled with the movable iron core; a spool valve, pushed by the rod; a housing guiding the spool valve; and a feed-back chamber, formed by steps of the spool valve and of the housing, wherein a sealing portion formed by the spool valve and the housing between an input port and the feed-back chamber has a length, which is not changed by movement of the spool valve.

According to a second aspect of the present invention, there is provided the electromagnetic valve, wherein a length of a sealing portion between the feedback chamber and the core is not changed by movement of the spool valve.

According to a third aspect of the present invention, there is provided the electromagnetic valve, wherein a groove is formed in an inner periphery of the housing between the input port and the feed-back chamber.

According to a fourth aspect of the present invention, there is provided the electromagnetic valve, wherein a groove is formed in an inner periphery of the housing between the feed-back chamber and the core.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A detailed explanation will be given of preferred embodiment of the present invention in reference to FIGS. 1 through 5 as follows, wherein the same numerical references are used for the same or similar portions and description of these portions is omitted.

Embodiment 1

Figure 1:
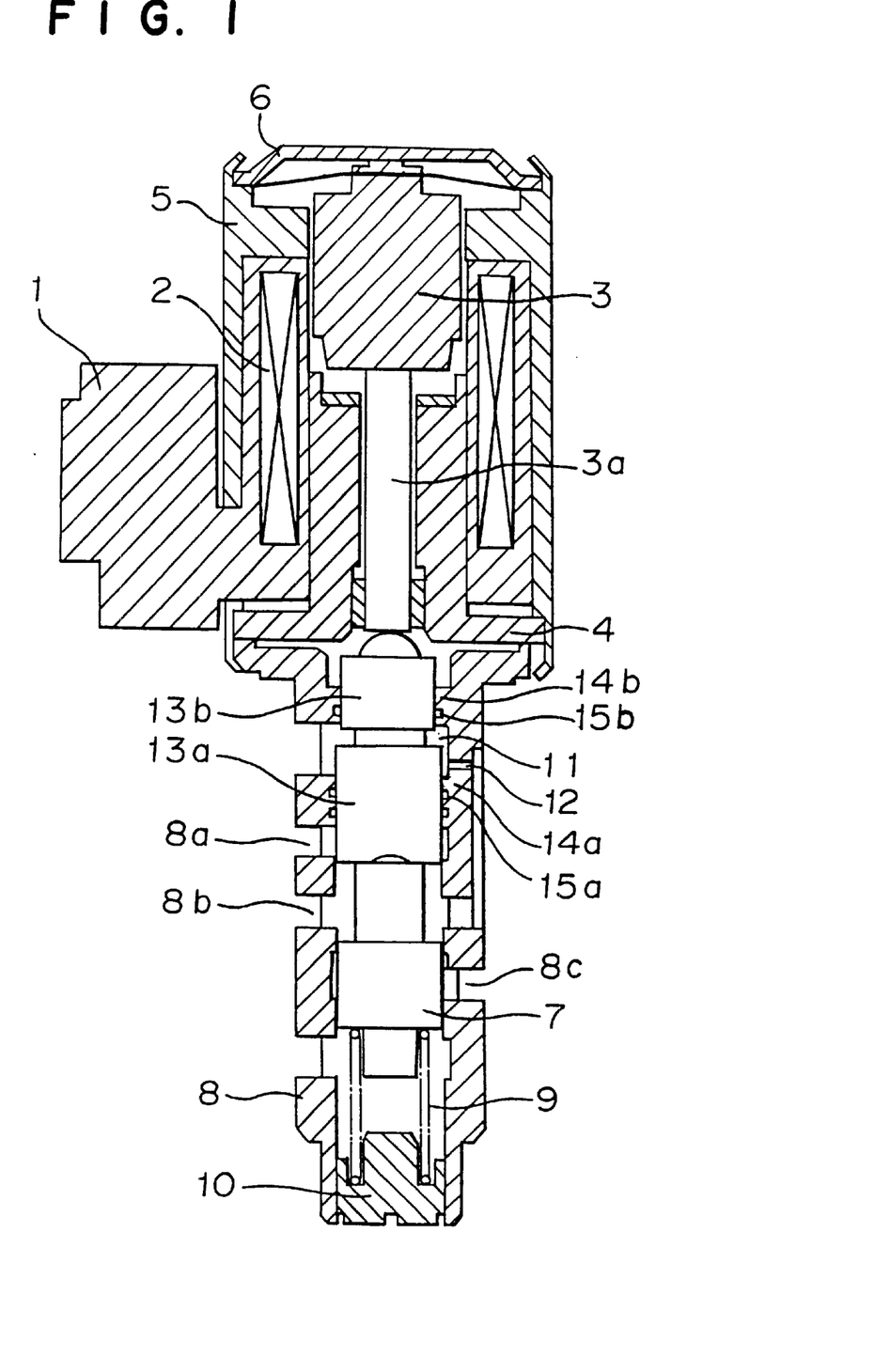
FIG. 1 is a side cross-sectional view in a state that a spool valve is moved to fully open a flow passage on a side of an input port of an electromagnetic valve according to Embodiment 1 of the present invention.
Figure 2:
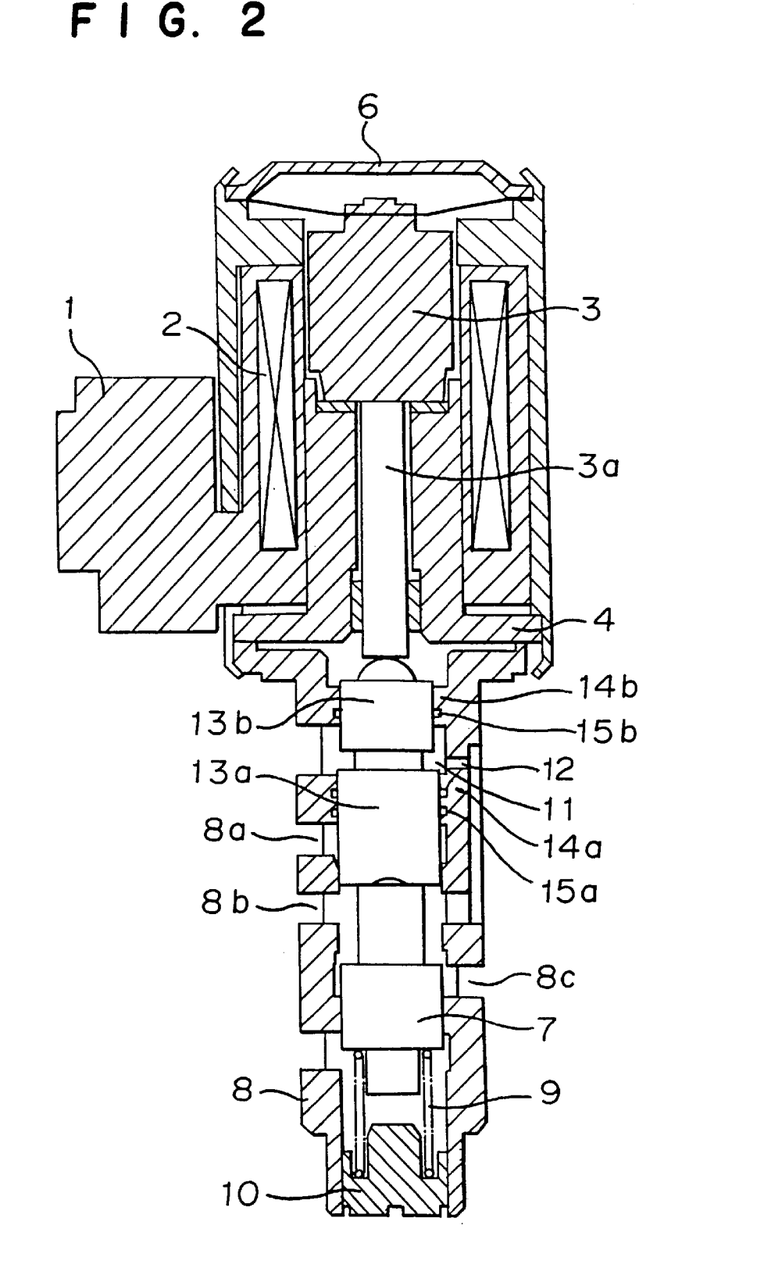
FIG. 2 is a side cross-sectional view illustrating a state that the spool valve is moved to fully open a flow passage on a side of a drain port in the electromagnetic valve according to Embodiment 1 of the present invention.
Figure 3:
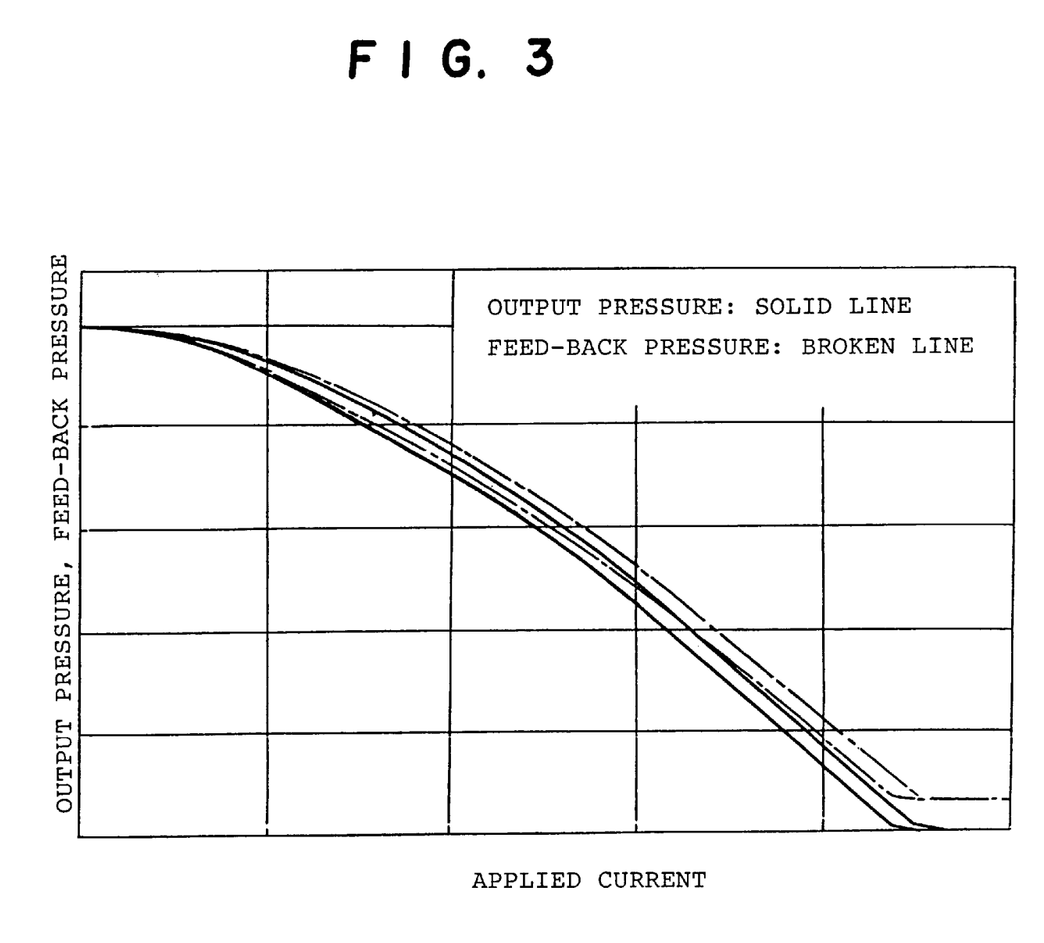
FIG. 3 illustrates a relationship between an output pressure and a feed-back pressure with respect to a current applied to the electromagnetic valve according to Embodiment 1 of the present invention.

FIGS. 1 and 2 are side cross-sectional views illustrating an electromagnetic valve according to Embodiment 1 of the present invention. FIG. 1 illustrates a state that a spool valve is moved to fully open a flow passage on a side of an input port when a current is not applied to a coil. FIG. 2 illustrates a state that the spool valve is moved to fully open a flow passage on a side of a drain port when the current is applied to the coil.

In FIGS. 1 and 2, numerical reference 1 designates a bobbin; numerical reference numeral 2 designates the coil wound around the bobbin 1; numerical reference 3 designates a movable iron core; numerical reference 3a designates a rod inserted in and fixed to the movable iron core 3; numerical reference 4 designates a core forming a magnetic circuit; numerical reference 5 designates a case forming the magnetic circuit with the core 4 and accommodating the above-mentioned component; numerical reference 6 designates a cap regulating movement of the movable iron core 3 in a direction adverse to that of the core 4; numerical reference 7 designates the spool valve pushed by the rod 3a; numerical reference 8 designates a housing, in which the spool valve 7 inserted therein slides on an inner periphery thereof; numerical reference 8a designates the input port; numerical reference 8b designates an output port; and numerical reference 8c designates a drain port.

Further, numerical reference 9 designates a spring urging the movable iron core 3 and the spool valve 7 in a direction of the cap 6; numerical reference 10 designates an adjust screw adjusting a force of the spring 9; numerical reference 11 designates a feed-back chamber formed by steps of the spool valve 7 and of the housing 8; numerical reference 12 designates a feed-back choke introducing an output pressure to the feed-back chamber 11; numerical reference 13a designates a spool land, being a part of the spool valve 7, for sealing leakage from the input port 8a to the feed-back chamber 11 in collaboration with the housing 8; and numerical reference 13b designates a spool land, being a part of the spool valve 7, for sealing leakage from the feed-back chamber 11 to the core 4 in collaboration with the housing 8.

Further, numerical reference 14a designates housing land as a part of the housing for sealing leakage from the intake port 8a to the feed-back chamber 11 in collaboration with the spool valve 7. Numerical reference 14b designates a housing land as a part of the housing 8 for sealing leakage from the feed-back chamber 11 to the core 4 in collaboration with the spool valve 7. Numerical reference 15a designates an aligning grove, formed in the housing land 14a, for aligning the spool valve 7. Numerical reference 15b designates an aligning groove, formed in the housing land 14b, for aligning the spool valve 7.

In the next, an operation will be described. When the current is not applied, as illustrated in FIG. 1, the spool valve 7 is positioned where a force of the spring 9 and a feed-back force generated by introducing the output pressure through the feed-back choke 12 to the feed-back chamber 11 to output a pressure, matching an initial set force of the spring 9, to the output port 8b. When the current is applied to the coil, as illustrated in FIG. 2, an electromagnetic force attracting the movable iron core 3 to the core 4 is effected, whereby a balancing point between the spring force and the feed-back force is changed to vary a rate of choking the input port 8a and the drain port 8c by the spool valve 7, whereby the output pressure is decreased. Thus, the output pressure is in proportion to the current applied to the coil 2.

When the spool valve 7 has eccentricity, inclination, and insufficient accuracy of shape, or the housing 8 does not have sufficient accuracy of shape, a pressure balance in circumferential directions of the spool valve 7 is disturbed by a flow from the input port 8a to the output port 8b, a flow to the drain port 8c, and a flow from the input port 8a to the feed-back chamber 11, which flows are caused when a pressure supplied to the input port 8a is increased. At this time, a phenomenon of hydraulic lock, by which the spool valve 7 is pushed to the housing 8, occurs to spoil an operation of the spool valve.

In this case, by a function of the aligning groove 15a, a pressure in the circumferential direction of the spool valve 7 is uniformed, whereby it becomes easy to align the spool valve 7, and the spool valve 7 can easily move.

Further, because the spool land 13a protrudes from the housing land 14a, the length of the sealing portion between the intake port 8a and the feed-back chamber 11 is not substantially changed, whereby a ratio between the output pressure and the feed-back force, i.e. pressure, is 1:1.

Figure 4:
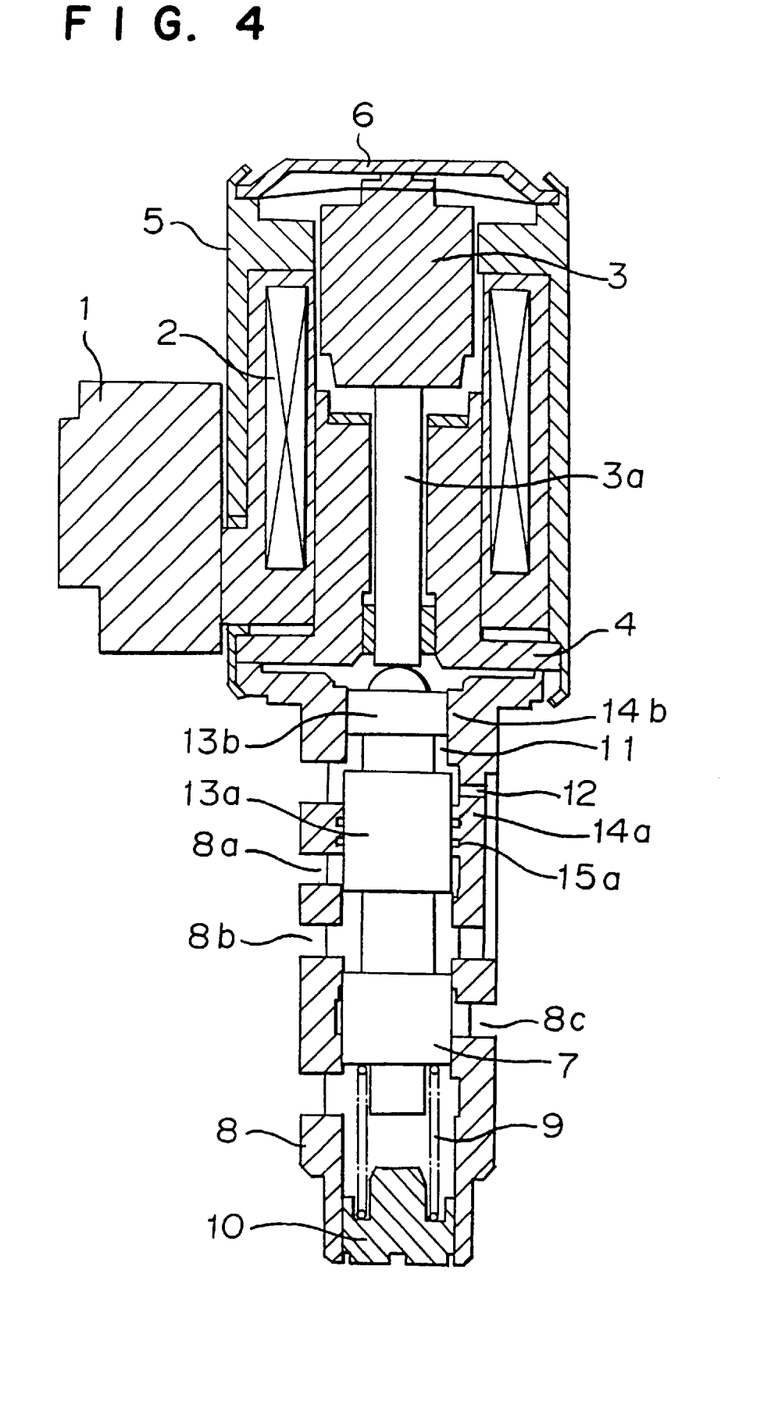
FIG. 4 is a side cross-sectional view illustrating a state that the spool valve is moved to fully open the flow passage on the side of the input port in the electromagnetic valve according to Embodiment 1 of the present invention.
Figure 5:
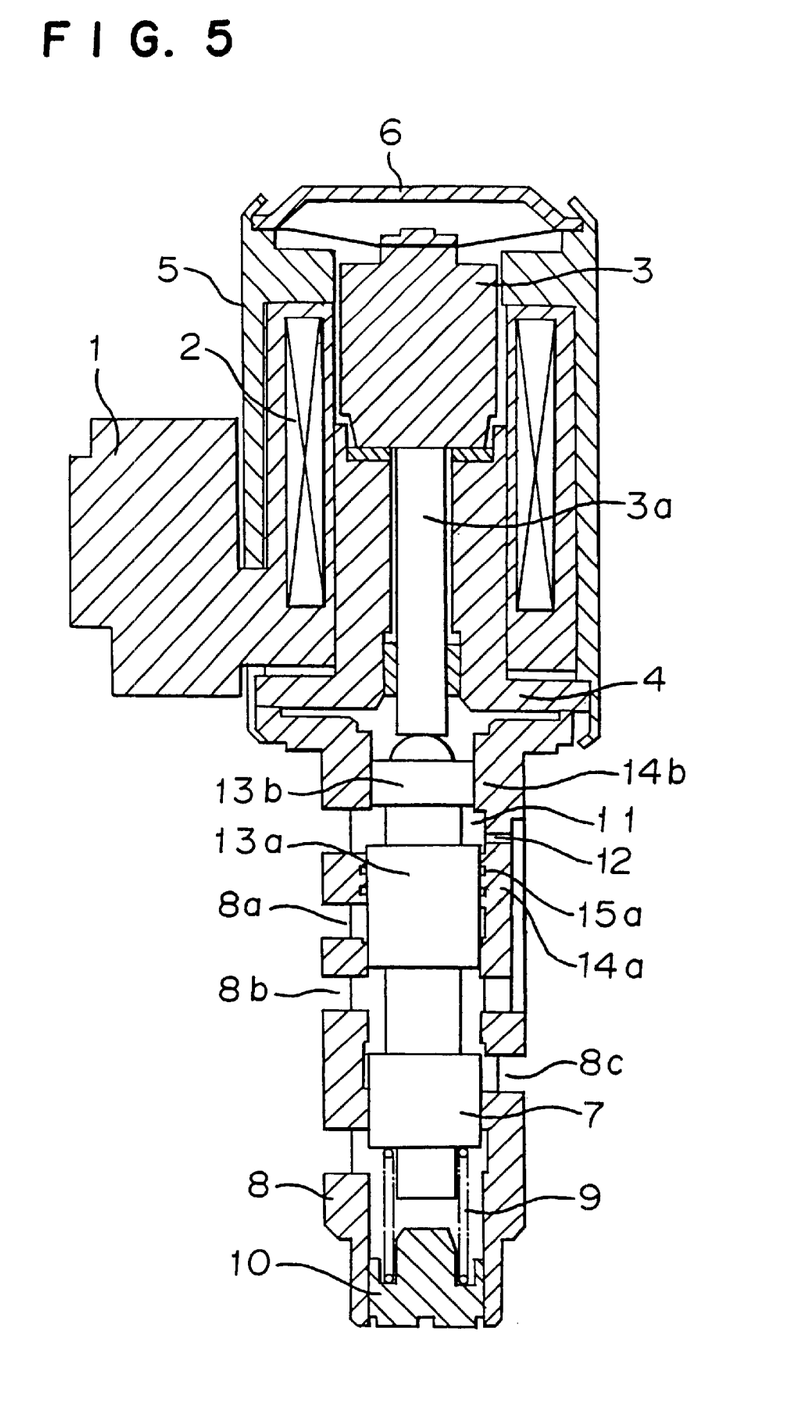
FIG. 5 is a side cross-sectional view illustrating a state that the spool valve is moved to fully open the flow passage on the side of the drain port in the electromagnetic valve according to Embodiment 1 of the present invention.

As illustrated in FIGS. 4 and 5, the spool land 13b may be constantly included in the housing land 14b on both ends of the movement of the spool valve to make a substantial length of the sealing portion between the feed-back chamber 11 and the core 4 unchanged. FIG. 4 illustrates the state that the current is not applied to the coil, and FIG. 5 illustrates the state that the current is applied to the coil.

As described, in the electromagnetic valve according to the present invention, the feed-back force, i.e. pressure, and the output pressure is constantly in the ratio of 1:1 by making the length of the sealing portion preventing the leakage from the input port 8a to the feed-back chamber 11 and the length of the sealing portion preventing the leakage from the feed-back chamber 11 to the core 4 unchanged even though the spool valve 7 is moved.

Further, by forming the aligning grooves 15a and 15b respectively in the sealing portion preventing the leakage from the input port 8a to the feed-back chamber 11 and the sealing portion preventing the leakage from the feed-back chamber 11 to the core 4 in collaboration with the spool valve 7 of the housing, even though the spool valve 7 is decentered and/or inclined, and further the pressure in the circumferential direction effecting on the spool valve 7 is insufficiently balanced, the balance is recovered by the aligning grooves 15a and 15b, the spool valve 7 is aligned, and resultantly a hydraulic lock is not apt to occur.

Meanwhile, since the aligning grooves 15a and 15b are formed in the housing 8, which does not move, positions of the aligning grooves 15a and 15b from the input port 8a, i.e. a high pressure side, are not changed, whereby a stable aligning force is obtainable.

Further, since the aligning grooves 15a and 15b are positioned in the housing 8, which does not move, it is possible to make the length of the sealing portion from the input port 8a to the feed-back chamber 11 and the length of the sealing portion from the feed-back chamber 11 to the core 4 unchanged when the spool valve 7 is moved without largely elongating a total length of the housing 8.

As described, by forming the grooves 15a and 15b for aligning the spool valve 7 on the inner diameter of the housing 8 to make the length of the sealing portion to the feed-back chamber 11 unchanged, it is possible to minimize a total length of the housing and to obtain the electromagnetic valve, by which the pressure can be stably controlled even under a high pressure.

Embodiment 2

Although, in Embodiment 1, the aligning grooves 15a and 15b are formed in both of the housing lands 14a and 14b, the aligning grooves may be formed in one of the housing lands.

Although the two aligning grooves 15a are formed in Embodiment 1, the number of the aligning grooves may be one or three or more.

Further, although the one aligning groove 15b is formed in Embodiment 1, the number of aligning grooves 15b may be two or more.

The first advantage of the electromagnetic valve according to the present invention is that it is possible to constantly obtain the feed-back force matching the output pressure, and to make the output pressure smooth with respect to a current directed.

The second advantage of the electromagnetic valve according to the present invention is that the spool valve is properly aligned, and a hydraulic lock seldom occurs.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application JP2000-73516 filed on Mar. 16, 2000 including specification, claims, drawings and summary are incorporated herein by reference in its entirety.

What is claimed is:

1. An electromagnetic valve comprising:

a bobbin, accommodated in a case and wound by a coil;

a core located in a central portion of the bobbin and forming a magnetic circuit;

a movable iron core, sucked in a direction of the core when a current is applied to the coil, so as to move between a first position when no current is applied to the coil and a second position when current is applied to the coil;

a rod integrally assembled with the movable iron core;

a spool valve, pushed by the rod between a first spool valve position and a second spool valve position corresponding with the first and second positions of said movable iron core;

a housing guiding the spool valve; and a feed-back chamber, formed by steps of the spool valve and of the housing, wherein a sealing portion, formed by the spool valve and the housing between an input port and the feed-back chamber, has a length, which is not changed by movement of the spool valve between said first spool valve position and said second spool valve position.

2. The electromagnetic valve according to claim 1, wherein a length of a sealing portion between the feed-back chamber and the core is not changed by movement of the spool valve.

3. The electromagnetic valve according to claim 1, wherein a groove is formed in an inner periphery of the housing, in the sealing portion between the input port and the feed-back chamber.

4. The electromagnetic valve according to claim 2, wherein a groove is formed in an inner periphery of the housing, in the sealing portion between the input port and the feed-back chamber.

5. The electromagnetic valve according to claim 1, wherein a groove is formed in an inner periphery of the housing, in the sealing portion between the feed-back chamber and the core.

6. The electromagnetic valve according to claim 2, wherein a groove is formed in an inner periphery of the housing, in the sealing portion between the feed-back chamber and the core.

7. The electromagnetic valve according to claim 3, wherein a groove is formed in an inner periphery of the housing, in the sealing portion between the feed-back chamber and the core.

8. The electromagnetic valve according to claim 4, wherein a groove is formed in an inner periphery of the housing, in the sealing portion between the feed-back chamber and the core.

* * * * *